United States Patent
Chosa et al.

(10) Patent No.: US 6,984,600 B2
(45) Date of Patent: Jan. 10, 2006

(54) OLEFIN POLYMERIZATION CATALYST

(75) Inventors: Satoru Chosa, Chigasaki (JP);
Kunihiko Tashino, Chigasaki (JP);
Motozo Yoshikiyo, Ichihara (JP);
Hiroshi Sato, Ichihara (JP)

(73) Assignees: Toho Catalyst Co., LTD, Kurobe (JP);
Ube Industries, LTD, Ube (JP)

( * ) Notice: Subject to any disclaimer, the term of this patent is extended or adjusted under 35 U.S.C. 154(b) by 12 days.

(21) Appl. No.: 10/895,141

(22) Filed: Jul. 21, 2004

(65) Prior Publication Data

US 2005/0032991 A1    Feb. 10, 2005

(30) Foreign Application Priority Data

Jul. 28, 2003    (JP)    ............... 2003-281034

(51) Int. Cl.
*B01J 37/00*    (2006.01)

(52) U.S. Cl. ............... 502/116; 502/103; 502/114; 502/115; 502/127; 526/126; 526/124.3; 526/124.2; 526/128

(58) Field of Classification Search ............... 502/103, 502/114, 115, 116, 127; 526/126, 124.3, 526/124.2, 128
See application file for complete search history.

(56) References Cited

U.S. PATENT DOCUMENTS

| 6,156,690 A | * | 12/2000 | Hosaka | ............... 502/118 |
| 6,228,791 B1 | * | 5/2001 | Kataoka et al. | ............... 502/115 |
| 2004/0077488 A1 | * | 4/2004 | Tashino et al. | ............... 502/113 |

FOREIGN PATENT DOCUMENTS

| EP | 0 841 348 A2 | * | 5/1998 |
| JP | 57-63310 | | 4/1982 |
| JP | 57-63311 | | 4/1982 |
| JP | 63-3010 | | 1/1988 |
| JP | 1-315406 | | 12/1989 |

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

An olefin polymerization catalyst comprising: (A1) a solid catalyst component prepared by contacting (a1) a dialkoxymagnesium, (b1) a tetravalent titanium halide, (c1) an electron compound, and (d1) a polysiloxane, (B) an organoaluminum compound of the formula $R^1_p AlQ_{3-p}$, and (C) an aminosilane compound of the formula $(R^2 R^3 N)Si(OR^4)_3$ has a high activity to hydrogen as compared with conventional catalysts and maintains the capability of producing polymers with a high stereoregularity at a high yield.

10 Claims, 1 Drawing Sheet

Fig 1.

(A1) Transition metal component
    (a1) Dialkoxymagnesium
    (b1) Tetravalent titanium halide
    (c1) Electron donor
    (d1) Polysiloxane (B) Organoaluminum component
    $R^1_p AlQ_{3-p}$
    $0 < p \leq 3$ (C) Aminosilane compound
    $(R^2 R^3 N)Si(OR^4)_3$ Contact — Olefin

OLEFIN POLYMERIZATION CATALYST

BACKGROUND OF THE INVENTION

1. Field of the Invention

The present invention relates to a catalyst for polymerization of olefins exhibiting excellent catalytic activity to hydrogen and capable of maintaining high stereoregularity of polymers and a high yield.

2. Description of Background Art

A solid catalyst component containing magnesium, titanium, an electron donor compound compound, and a halogen as essential components used for polymerization of olefins such as propylene has been known in the art. A large number of methods for polymerizing or copolymerizing olefins in the presence of a catalyst for olefin polymerization comprising the above solid catalyst component, an organoaluminum compound, and an organosilicon compound have been proposed. For example, Patent Document 1 (Japanese Patent Application Laid-open No. 57-63310) and Patent Document 2 (Japanese Patent Application Laid-open Japanese Unexamined Patent Publication No. 57-63311) propose a method for polymerizing olefins, particularly olefins with three or more carbon atoms, in which a catalyst comprising a solid catalyst component containing a magnesium compound, a titanium compound, and an electron donor compound, an organoaluminum compound, and an organosilicon compound having an Si—O—C linkage in combination is used. However, because these methods are not necessarily satisfactory for producing highly stereoregular polymers in a high yield, improvement of these methods has been desired.

Japanese Patent Application Laid-open No. 63-3010 proposes a catalyst and a method for polymerizing propylene. The catalyst comprises a solid catalyst component, obtained by processing a powder produced from dialkoxymagnesium, aromatic dicarboxylic acid diester, aromatic hydrocarbon, and titanium halide with heat, an organoaluminum compound, and an organosilicon compound.

Japanese Patent Application Laid-open No. 1-315406 proposes another propylene polymerization catalyst and a method for polymerizing propylene in the presence of this catalyst. The catalyst comprises a solid catalyst component obtained by preparing a suspension from diethoxymagnesium and alkyl benzene, causing this suspension to come into contact with titanium tetrachloride, reacting the resulting product with phthalic acid dichloride to produce a solid product, and further reacting the solid product catalytically with titanium tetrachloride in the presence of alkyl benzene, an organoaluminum compound, and an organosilicon compound.

All of the above-described conventional technologies have attained certain results in improving catalytic activity to the extent of permitting dispensing with an ash-removal step for removing catalyst residues such as chlorine and titanium from formed polymers, improving the yield of stereoregular polymers, and improving durability of catalytic activity during polymerization.

The polymers produced using these catalysts are used in a variety of applications including formed products such as vehicles and household electric appliances, containers, and films. These products are manufactured by melting polymer powders produced by polymerization and forming the melted polymers using various molds. In manufacturing formed products, particularly large products by injection molding or the like, melted polymers are sometimes required to have a high fluidity (a melt flow rate). Accordingly, a large number of studies have been undertaken to increase the melt flow rate of the polymers.

The melt flow rate greatly depends on the molecular weight of the polymers. In the industry, hydrogen is generally added as a molecular weight control agent for polymers during polymerization of propylene. In this instance, a large quantity of hydrogen is usually added to produce low molecular weight polymers having a high melt flow rate. However, the quantity of hydrogen which can be added is limited because pressure resistance of the reactor is limited because of safety. In order to add a larger amount of hydrogen, the partial pressure of monomers to be polymerized has to be decreased. The decrease in the partial pressure, however, is accompanied by a decrease in productivity. Additionally, use of a large amount of hydrogen may bring about a problem of cost. Development of a catalyst capable of producing polymers with a high melt flow rate by using a smaller amount of hydrogen, in other words, a catalyst which has a high activity to hydrogen as compared with conventional catalysts, while maintaining capability of producing polymers with a high stereoregularity and exhibiting high yield performance has therefore been desired. Conventional technologies have been insufficient in solving these requirements.

SUMMARY OF THE INVENTION

Therefore, an object of the present invention is to provide an olefin polymerization catalyst having a high activity to hydrogen as compared with conventional catalysts and maintaining the capability of producing polymers with a high stereoregularity at a high yield.

As a result of extensive studies, the present inventors have found that a catalyst comprising a specific solid catalyst component made from dialkoxymagnesium, tetravalent titanium halide, and an electron donor compound as raw materials, an organoaluminum compound, and an aminosilane compound having a specific structure has a high activity to hydrogen as compared with conventional catalysts and maintains the capability of producing polymers with a high stereoregularity at a high yield. This finding has led to the completion of the present invention.

Specifically, the present invention provides an olefin polymerization catalyst comprising the following components (A1), (B1), and (C1):

(A1) a solid catalyst component prepared by contacting (a1) a dialkoxymagnesium, (b1) a tetravalent titanium halide, (c1) an electron donor compound, and (d1) a polysiloxane, (B1) an organoaluminum compound of the following formula (1), $$R^1_p AlQ_{3-p} \qquad (1)$$

wherein $R^1$ represents an alkyl group having 1–4 carbon atoms, Q represents a hydrogen atom or a halogen atom, and p represents a real number satisfying the formula $0<p\leqq 3$, and (C1) an aminosilane compound of the following formula (2), $$(R^2R^3N)Si(OR^4)_3 \qquad (2)$$

wherein $R^2$ represents a linear or branched alkyl group having 1–12 carbon atoms or a hydrogen atom, $R^3$ represents a linear or branched alkyl group having 1–12 carbon atoms which may be either the same as or different from $R^2$, and $R^4$ represents a linear or branched alkyl group having 1–4 carbon atoms.

The present invention further provides an olefin polymerization catalyst comprising the following components (A2), (B1), and (C1):

(A2) a solid catalyst component prepared by contacting (a1) a dialkoxymagnesium, (b1) a tetravalent titanium halide, (c2) a phthalic acid diester derivative, (B1) an organoaluminum compound of the following formula (1),

$$R^1_p AlQ_{3-p} \quad (1)$$

wherein $R^1$ represents an alkyl group having 1–4 carbon atoms, Q represents a hydrogen atom or a halogen atom, and p represents a real number satisfying the formula $0 < p \leq 3$, and (C1) an aminosilane compound of the following formula (2),

$$(R^2 R^3 N)Si(OR^4)_3 \quad (2)$$

wherein $R^2$ represents a linear or branched alkyl group having 1–12 carbon atoms or a hydrogen atom, $R^3$ represents a linear or branched alkyl group having 1–12 carbon atoms which may be either the same as or different from $R^2$, and $R^4$ represents a linear or branched alkyl group having 1–4 carbon atoms.

BRIEF DESCRIPTION OF THE DRAWINGS

FIG. 1 is a flowchart showing a process for preparing the catalyst component and polymerization catalyst of the present invention.

DETAILED DESCRIPTION OF THE INVENTION AND PREFERRED EMBODIMENT

As the dialkoxymagnesium (a1) (hereinafter may be referred to as "component (a1)") used for preparing the solid catalyst component (A1) (hereinafter may be referred to as "component (A)") in the catalyst for olefin polymerization of the present invention, a compound represented by the formula $Mg(OR^5)(OR^6)$, wherein $R^5$ and $R^6$ individually represent an alkyl group having 1–10 carbon atoms, is preferable. Specific examples include dimethoxymagnesium, diethoxymagnesium, dipropoxymagnesium, dibutoxymagnesium, ethoxymethoxymagnesium, ethoxypropoxymagnesium, and butoxyethoxymagnesium. Of these, diethoxymagnesium is particularly preferable. These dialkoxymagnesium compounds may be prepared by reacting metallic magnesium with an alcohol in the presence of a halogen or a halogen-containing metal compound or the like. The above dialkoxymagnesium compounds may be used either individually or in combination of two or more.

The dialkoxymagnesium compound used for preparing the component (A1) in the present invention may be in the form of either granules or powder and either amorphous or spherical in the configuration. For example, when spherical dialkoxymagnesium is used, the resulting polymer is in the form of a powder having a more excellent granular form and a narrower particle size distribution. This improves handle ability of the polymer powder produced during polymerization operation and eliminates problems such as clogging caused by fine particles contained in the polymer powder.

The spherical dialkoxymagnesium need not necessarily be completely spherical, but may be oval or potato-shaped. Specifically, the particles may have a ratio (l/w) of the major axis diameter (l) to the minor axis diameter (w) usually of 3 or less, preferably of 1 to 2, and more preferably of 1 to 1.5.

Dialkoxymagnesium with an average particle size from 1 to 200 μm can be used. A more preferable average particle size is 5 to 150 μm. In the case of spherical dialkoxymagnesium, the average particle size is usually from 1 to 100 μm, preferably from 5 to 50 μm, and more preferably from 10 to 40 μm. A powder having a narrow particle size distribution with a small content of fine and coarse powder is preferably used. Specifically, the content of particles with a diameter of 5 μm or less should be 20% or less, and preferably 10% or less. On the other hand, the content of particles with a diameter of 100 μm or more should be 10% or less, and preferably 5% or less. Moreover, the particle size distribution represented by ln (D90/D10), wherein D90 is a particle size of 90% of the integrated particle size and D10 is a particle size of 10% of the integrated particle size, is 3 or less, and preferably 2 or less.

Methods for producing such spherical dialkoxymagnesium are described in, for example, Japanese Patent Applications Laid-open No. 58-41832, No. 62-51633, No. 3-74341, No. 4-368391, and No. 8-73388.

The tetravalent titanium halide (b1) (hereinafter may be referred to as "component (b1)") used for preparing the component (A1) in the present invention is one or more compounds selected from titanium halides and alkoxytitanium halides of the formula $Ti(OR^7)_n X_{4-n}$, wherein $R^7$ indicates an alkyl group having 1–4 carbon atoms, X is a halogen atom, and n is an integer of $0 \leq n \leq 4$.

Specific examples include, as titanium halides, titanium tetrahalides such as titanium tetrachloride, titanium tetrabromide, and titanium tetraiodide and, as alkoxytitanium halides, methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, and tri-n-butoxy titanium chloride. Of these, titanium tetrahalides are preferable, with titanium tetrachloride being particularly preferable. These titanium compounds may be used either individually or in combination of two or more.

The electron donor compound used for preparing the solid catalyst component (A1) (hereinafter may be simply referred to as "component (c1)") is an organic compound containing an oxygen atom or a nitrogen atom. Alcohols, phenols, ethers, esters, ketones, acid halides, aldehydes, amines, amides, nitriles, isocyanates, and organosilicon compounds containing an Si—O—C bond can be given as examples.

Specific examples include: alcohols such as methanol, ethanol, n-propanol, and 2-ethylhexanol; phenols such as phenol and cresol; ethers such as methyl ether, ethyl ether, propyl ether, butyl ether, amyl ether, diphenyl ether, 9,9-bis(methoxymethyl)fluorene, and 2-isopropyl-2-iso-pentyl-1,3-dimethoxypropane; monocarboxylic acid esters such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluate, ethyl p-toluate, methyl anisate, and ethyl anisate; dicarboxylic acid esters such as diethyl malonate, dipropyl malonate, dibutyl malonate, diisobutyl malonate, dipentyl malonate, dineopentyl malonate, diethyl isopropylbromo malonate, diethyl butylbromo malonate, diethyl isobutylbromo malonate, diethyl diisopropyl malonate, diethyl dibutyl malonate, diethyl diisobutyl malonate, diethyl diisopentyl malonate, diethyl isopropylisobutyl malonate, dimethyl isopropylisopentyl malonate, diethyl (3-chloro-n-propyl) malonate, diethyl bis(3-bromo-n-propyl) malonate, diethyl maleate, dibutyl maleate, dimethyl adipate, diethyl adipate, dipropyl adipate, dibutyl adipate, diisodecyl adipate, dioctyl adipate, phthalic acid diesters, and phthalic acid diester derivatives; ketones such as acetone, methyl ethyl ketone, methyl butyl ketone, acetophenone, and benzophenone; acid halides such as phthalic acid dichloride and terephthalic acid dichloride; aldehydes such as acetaldehyde, propionaldehyde, octylaldehyde, and benzaldehyde; amines such as methylamine, ethylamine, tributylamine, piperidine, aniline, and pyridine; amides such as oleic acid amide and stearic acid amide; nitriles such as acetonitrile, benzonitrile, and tolunitrile; and isocyanates such as methyl isocyanate and ethyl isocyanate; and organosilicon compounds containing an Si—O—C bond such as phenylalkoxysilane, alkylalkoxysilane, phenylalkylalkoxysilane, cycloalkylalkoxysilane, and cycloalkylalkylalkoxysilane.

Of these electron donor compounds, esters, particularly aromatic dicarboxylic acid diesters are preferable, with phthalic acid diesters and phthalic acid diester derivatives being ideal compounds. Specific examples of the phthalic acid diester include the following compounds: dimethyl phthalate, diethyl phthalate, di-n-propyl phthalate, diisopropyl phthalate, di-n-butyl phthalate, diisobutyl phthalate, ethylmethyl phthalate, methyl(isopropyl) phthalate, ethyl(n-propyl) phthalate, ethyl(n-butyl) phthalate, ethyl(isobutyl) phthalate, di-n-pentyl phthalate, diisopentyl phthalate, dineopentyl phthalate, dihexyl phthalate, di-n-heptyl phthalate, di-n-octyl phthalate, bis(2,2-dimethylhexyl) phthalate, bis (2-ethylhexyl) phthalate, di-n-nonyl phthalate, diisodecyl phthalate, bis(2,2-dimethylheptyl) phthalate, n-butyl(isohexyl) phthalate, n-butyl(2-ethylhexyl) phthalate, n-pentylhexyl phthalate, n-pentyl(isohexyl) phthalate, isopentyl (heptyl) phthalate, n-pentyl(2-ethylhexyl) phthalate, n-pentyl(isononyl) phthalate, isopentyl(n-decyl) phthalate, n-pentylundecyl phthalate, isopentyl(isohexyl) phthalate, n-hexyl(2,2-dimethylhexyl) phthalate, n-hexyl(2-ethylhexyl) phthalate, n-hexyl(isononyl) phthalate, n-hexyl(n-decyl) phthalate, n-heptyl(2-ethylhexyl) phthalate, n-heptyl (isononyl) phthalate, n-heptyl(neodecyl) phthalate, and 2-ethylhexyl(isononyl) phthalate. One or more of these phthalic acid diesters can be used.

As the phthalic acid diester derivatives, compounds derived from phthalic acid diesters by replacing one or two hydrogen atoms on the benzene ring, to which the two alkoxycarbonyl groups of the phthalic acid diester bond, with an alkyl group having 1–5 carbon atoms or a halogen atom such as a chlorine, bromine, or fluorine can be given. The solid catalyst component prepared by using these phthalic acid diester derivatives as the electron donor compound (c1) can increase the melt flow rate of the polymer due to the high activity or high response of the solid catalyst component against hydrogen even in the case of using a smaller or equivalent amount of hydrogen during the polymerization. As specific examples, dineopentyl 4-methylphthalate, dineopentyl 4-ethylphthalate, dineopentyl 4,5-dimethylphthalate, dineopentyl 4,5-diethylphthalate, diethyl 4-chlorophthalate, di-n-butyl 4-chlorophthalate, dineopentyl 4-chlorophthalate, diisobutyl 4-chlorophthalate, diisohexyl 4-chlorophthalate, diisooctyl 4-chlorophthalate, diethyl 4-bromophthalate, di-n-butyl 4-bromophthalate, dineopentyl 4-bromophthalate, diisobutyl 4-bromophthalate, diisohexyl 4-bromophthalate, diisooctyl 4-bromophthalate, diethyl 4,5-dichlorophthalate, di-n-butyl 4,5-dichlorophthalate, diisohexyl 4,5-dichlorophthalate, and diisooctyl 4,5-dichlorophthalate can be given. Of these, dineopentyl 4-bromophthalate, di-n-butyl 4-bromophthalate, and diisobutyl 4-bromophthalate are preferable.

The above ester compounds are preferably used in combination of two or more. In this instance, the esters are preferably combined so that the total carbon atom number in the alkyl group possessed by one ester may differ four or more from that possessed by another ester.

The polysiloxane (d1) (hereinafter may be simply referred to as "component (d1)") used for preparing the solid catalyst component (A1) of the present invention is a polymer possessing a siloxane bond (—Si—O—) in the main chain. This polymer, generally referred to as silicone oil, is a chain-structured, partially hydrogenated, cyclic, or denatured polysiloxane which is liquid or viscous at normal temperatures with a viscosity at 25° C. in the range of 0.02–100 cm$^2$/s (2–10,000 cSt), and preferably in the range of 0.03–5 cm$^2$/s (3–500 cSt).

As examples of the chain-structured polysiloxane, dimethylpolysiloxane and methylphenylpolysiloxane can be given; as examples of the partially hydrogenated polysiloxane, methyl hydrogen polysiloxanes with a hydrogenation degree of 10 to 80% can be given; as examples of the cyclic polysiloxane, hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane can be given; as examples of the modified polysiloxane, higher fatty acid group-substituted dimethylsiloxane, epoxy group-substituted dimethylsiloxane, and polyoxyalkylene group-substituted dimethylsiloxane can be given. Of these, decamethylcyclopentasiloxane and dimethylpolysiloxane are preferable, with decamethylcyclopentasiloxane being particularly preferable.

The component (A1) of the present invention can be preferably prepared by contacting the above components (a1), (b1), (c1), and (d1) in an aromatic hydrocarbon (e1) (hereinafter may be simply referred to as "component (e1)"). Aromatic hydrocarbons having a boiling point of 50° C. to 150° C. such as toluene, xylene, and ethylbenzene are preferably used as the component (e1). These aromatic hydrocarbons can be used either individually or in combination of two or more.

In the preparation of the solid catalyst component (A2) of the present invention, the same compounds as used for the preparation of the solid catalyst component (A1) can be used as the dialkoxymagnesium (a1) and the tetravalent titanium halide (b1). As the phthalic acid diester derivative (c2) (hereinafter may be referred to simply as "component (c2)"), the same phthalic acid diester derivatives as those used as the electron donor compound (c1) in the preparation of the solid catalyst component (A1) can be used.

In a preferred embodiment of the present invention, the component (A2) is prepared by contacting the above components (a1), (b1), and (c2) in an aromatic hydrocarbon (e1). Aromatic hydrocarbons having a boiling point of 50° C. to 150° C. such as toluene, xylene, and ethylbenzene are preferably used as the component (e1). These aromatic hydrocarbons can be used either individually or in combination of two or more.

The process for preparing the component (A1) of the present invention will now be described.

One specific example of the process for preparing the solid component (A1) comprises suspending the dialkoxymagnesium compound (a1) in an alcohol, a halogenated hydrocarbon solvent, the tetravalent titanium halide (b1), or the aromatic hydrocarbon (e1), causing the electron donor compound (c1) such as a phthalic acid diester and/or the tetravalent titanium halide (b1) to contact the suspension, and further causing the polysiloxane (d1) to contact the mixture.

The process for preparing the component (A2) of the present invention will now be described.

Specifically, a process for preparing the solid component comprises suspending the dialkoxymagnesium compound (a1) in an alcohol, a halogenated hydrocarbon solvent, the tetravalent titanium halide (b1), or the aromatic hydrocarbon (e1), and causing the phthalic acid diester derivative (c2) and/or the tetravalent titanium halide (b1) to contact the suspension.

In the process for preparing the solid component (A1) and the solid component (A2) of the present invention, a spherical solid catalyst component with a sharp particle size distribution can be obtained by using a spherical magnesium compound. Such a spherical solid catalyst component with a sharp particle size distribution can also be obtained without using a spherical magnesium compound if particles are formed by a spray drying method in which a solution or suspension is sprayed and dried using a sprayer, for example.

These components contact one another in a vessel equipped with a stirrer in an inert gas atmosphere from which water and the like have been removed while stirring. The contact temperature, which is a temperature when these components are caused to contact, may be either the same as or different from the reaction temperature. When the components contact one another by stirring for preparing the mixture or are dispersed or suspended for a denaturing treatment, the components may be stirred at a comparatively low temperature of around room temperature. When a reaction product is to be obtained by reacting the components after the contact, the mixture is preferably stirred in the temperature range of 40–130° C. The reaction does not sufficiently proceed at a reaction temperature below 40° C., resulting in a solid component with inadequate properties. On the other hand, control of the reaction becomes difficult at a temperature above 130° C. due to vaporization of the solvent and the like. The reaction time is one minute or more, preferably ten minutes or more, and still more preferably 30 minutes or more.

The following examples are given more specifically as the preferable order of contacting the components one another for preparing the solid catalyst component (A1) of the present invention.

(1) (a1)→(e1)→(b1)→(c1)→(d1)→<<intermediate washing→(e 1)→(b1)>>→final washing→solid catalyst component (A1)

(2) (a1)→(e1)→(c1)→(b1)→(d1)→<<intermediate washing→(e 1)→(b1) >>→final washing solid catalyst component (A1)

(3) (a1)→(e1)→(b1)→(c1)→(d1)→>>intermediate washing→(e 1)→(b1)→(c1)>>→final washing→solid catalyst component (A1)

(4) (a1)→(e1)→(b1)→(c1)→(d1)→<<intermediate washing→(e 1)→(c1)→(b1)→>>final washing→solid catalyst component (A1)

(5) (a1)→(e1)→(c1)→(b1)→(d1)→<<intermediate washing→(e 1)→(b1)→(c1)>>→final washing→solid catalyst component (A1)

(6) (a1)→(e1)→(c1)→(b1)→(d1)→<<intermediate washing→(e 1)→(c1)→(b1)>>→final washing solid catalyst component (A1)

The following examples are given more specifically as the preferable order of contacting the components one another for preparing the solid catalyst component (A2) of the present invention.

(7) (a1)→(e1)→(b1)→(c2)→<<intermediate washing→(e 1)→(b1)>>→final washing solid catalyst component (A2)

(8) (a1)→(e1)→(c2)→(b1)→<<intermediate washing→(e 1)→(b1)>>→final washing solid catalyst component (A2)

(9) (a1)→(e1)→(b1)→(c2)→<<intermediate washing→(e 1)→(b1)→(c2)>>→final washing→solid catalyst component (A2)

(10) (a1)→(e1)→(b1)→(c2)→<<intermediate washing→(e 1)→(c2)→(b1)>>→final washing→solid catalyst component (A2)

(11) (a1)→(e1)→(c2)→(b1)→<<intermediate washing→(e 1)→(b1)→(c2)>>→final washing→solid catalyst component (A2)

(12) (a1)→(e1)→(c2)→(b1)→>>intermediate washing→(e 1)→(c2)→(b1)>>→final washing→solid catalyst component (A2)

The catalyst activity can be further improved if the steps in the double parentheses (( )) in the above processes of contact are repeated several times, if required. The components (b1) and (e1) used in the steps in the double parentheses may be either newly added components or residues from the previous steps. In addition to the washing steps indicated in the above processes (1) to (12), the intermediate products in any of the above contact steps may be washed with a hydrocarbon compound which is liquid at normal temperatures.

Based on the above description, a particularly preferable process for preparing the solid catalyst component (A1) comprises suspending the dialkoxymagnesium compound (a1) in the aromatic hydrocarbon (e1) having a boiling point in the range of 50–150° C., causing the tetravalent titanium halide (b1) to contact the suspension, and reacting the mixture. In the above process, one or more electron donor compounds (c1) such as phthalic acid diesters are caused to contact the suspension at a temperature of −20° C. to 130° C., either before or after the tetravalent titanium halide (b1) is contacted, the electron donor compound (c1) is further caused to contact, and the linear or cyclic polysiloxane (d1) is caused to contact at a temperature of 20° C. to 130° C. Then, the mixture is reacted to obtain a solid reaction product (I). In this instance, it is desirable to carry out an aging reaction at a low temperature either before or after the above one or more electron donor compounds are caused to contact the suspension. After washing the solid reaction product (I) with a hydrocarbon compound which is liquid at normal temperatures (intermediate washing), the tetravalent titanium halide (b1) is again caused to contact the solid reaction product (I) in the presence of an aromatic hydrocarbon compound at a temperature of −20° C. to 100° C., and the mixture is reacted to obtain a solid reaction product (II)0. As required, the intermediate washing and the reaction may be further repeated several times. When reacting the mixture after again causing the tetravalent titanium halide (b1) to contact, the electron donor compound (c1) may be caused to contact together. Next, the solid reaction product (II) is washed with a hydrocarbon which is liquid at normal temperatures (final washing) to obtain the solid catalyst component (A).

Based on the above description, a particularly preferable process for preparing the solid catalyst component (A2) comprises suspending the dialkoxymagnesium compound (a1) in the aromatic hydrocarbon compound (e1) having a boiling point in the range of 50–150° C., causing the tetravalent titanium halide (b1) to contact the suspension, and reacting the mixture. In the above process, one or more phthalic acid diesters (c2) are caused to come in contact the suspension at a temperature from −20° C. to 130° C., either before or after the tetravalent titanium halide (b1) is contacted, to obtain a solid reaction product (III). In this instance, it is desirable to carry out an aging reaction at a low temperature either before or after the above one or more electron donor compounds are caused to contact the suspension. After washing the solid reaction product (III) with a hydrocarbon compound which is liquid at normal temperatures (intermediate washing), the tetravalent titanium halide (b1) is again caused to contact the solid reaction product (III) in the presence of an aromatic hydrocarbon compound at a temperature of −20° C. to 100° C., and the mixture is reacted to obtain a solid reaction product (IV). As required, the intermediate washing and the reaction may be further repeated several times. When reacting the mixture after again causing the tetravalent titanium halide (b1) to contact, the electron donor compound (c2) may be caused to contact together. Next, the solid reaction product (V) is washed with a hydrocarbon which is liquid at normal temperatures (final washing) to obtain the solid catalyst component (A2).

Preferable conditions of the above reactions and washing operations are as follows.

Low temperature aging reaction: −20° C. to 70° C., preferably −10° C. to 60° C., and more preferably 0° C. to 30° C., for 1 minute to 6 hours, preferably 5 minutes to 4 hours, and particularly preferably 10 minutes to 3 hours.

Reaction: 40° C. to 130° C., preferably 70° C. to 120° C., and particularly preferably 80° C. to 115° C., for 0.5 to 6 hours, preferably 0.5 to 5 hours, and particularly preferably 1 to 4 hours.

Washing: 0° C. to 110° C., preferably 30° C. to 100° C., and particularly preferably 30° C. to 90° C., from 1 to 20 times, preferably 1 to 15 times, and particularly preferably 1 to 10 times. Hydrocarbons used for washing are preferably aromatic hydrocarbons or saturated hydrocarbons which are liquid at normal temperatures. Specific examples include aromatic hydrocarbons such as toluene, xylene, and ethylbenzene, and saturated hydrocarbons such as hexane, heptane, and cyclohexane. The aromatic hydrocarbons are preferably used for the intermediate washing, whereas the saturated hydrocarbons are preferably used for the final washing.

The ratio of the compounds used for the preparation of the solid catalyst components (A1) and (A2) cannot be generically defined, because such a ratio varies according to the process employed. For example, the tetravalent titanium halide (b1) is used in an amount from 0.5 to 100 mol, preferably from 0.5 to 50 mol, still more preferably from 1 to 10 mol; the electron donor compound (c1) or phthalic acid diester (c2) is used in an amount from 0.01 to 10 mol, preferably from 0.01 to 1 mol, and still more preferably from 0.02 to 0.6 mol; the aromatic hydrocarbon (e1) is used in an amount from 0.001 to 500 mol, preferably from 0.001 to 100 mol, and still more preferably from 0.005 to 10 mol; and the polysiloxane (d1) is used in an amount of from 0.01 to 100 g, preferably from 0.05 to 80 g, and still more preferably from 1 to 50 g, for one mol of the dialkoxymagnesium (a1).

Although there are no specific limitations to the amounts of titanium, magnesium, halogen atoms, electron donor compounds, and phthalic acid diester derivatives in the solid catalyst components (A1) and (A2), the content of titanium is from 1.0 to 8.0 wt %, preferably from 2.0 to 8.0 wt %, and still more preferably from 3.0 to 8.0 wt %; the content of magnesium is from 10 to 70 wt %, preferably from 10 to 50 wt %, more preferably from 15 to 40 wt %, and particularly preferably from 15 to 25 wt %; the content of halogen atoms is from 20 to 90 wt %, preferably from 30 to 85 wt %, more preferably from 40 to 80 wt %, and particularly preferably from 45 to 75 wt %; and the total amount of electron donor compounds is from 0.5 to 30 wt %, preferably from 1 to 25 wt %, and particularly preferably from 2 to 20 wt %; and the total amount of phthalic acid diester derivatives is from 0.5 to 30 wt %, preferably from 1 to 25 wt %, and particularly preferably from 2 to 20 wt %.

There are no specific limitations to the organoaluminum compound (B) (hereinafter may be simply referred to as "component (B)") used for preparing the catalyst for olefin polymerization of the present invention, inasmuch as the compound has a structure of the above formula (1). In the formula (1), an ethyl group and isobutyl group are preferable as $R^1$, a hydrogen atom, chlorine atom, and bromine atom are preferable as Q, and p is preferably an integer of 2 or 3, and particularly preferably 3. As specific examples of such an organoaluminum compound (B), triethylaluminum, diethylaluminum chloride, triisobutylaluminum, diethylaluminum bromide, and diethylaluminum hydride can be given. These compounds may be used either individually or in combination of two or more. Triethylaluminum and triisobutylaluminum are preferably used.

The compounds represented by the above formula (2) can be given as the aminosilane compound (C) (hereinafter may be simply referred to as "component (C)") which can be used for preparing the catalyst for olefin polymerization of the present invention. The aminosilane compound is a compound having a nitrogen atom directly bonded to a silicon atom such as a monoalkylaminotrialkoxysilane and a dialkylaminotrialkoxysilane.

As specific compounds, dimethylaminotriethoxysilane, diethylaminotrimethoxysilane, diethylaminotriethoxysilane, diethylamino-tri-n-propoxysilane, di-n-propylaminotriethoxysilane, methyl(n-propyl)aminotriethoxysilane, t-butylaminotriethoxysilane, ethyl(n-propyl)aminotriethoxysilane, ethyl(iso-propyl)aminotriethoxysilane, methylethylaminotriethoxysilane, and the like can be given. One or more of these compounds can be used. Of these, diethylaminotrimethoxysilane is preferable.

In addition to the above components, an organosilicon compound other than the above-described aminosilane compound (hereinafter may be simply referred to as "component (D)") may be used for preparing the catalyst for olefin polymerization of the present invention. As an example of such an organosilicon compound (D), a compound of the following formula (3) can be given.

$$R^8_q Si(OR^9)_{4-q} \quad (3)$$

wherein $R^8$ individually represents an alkyl group having 1–12 carbon atoms, cycloalkyl group, phenyl group, vinyl group, allyl group, or aralkyl group, $R^9$ individually represents an alkyl group having 1–4 carbon atoms, cycloalkyl group, phenyl group, vinyl group, allyl group, or aralkyl group, and q is an integer satisfying an inequality of $0 \leq q \leq 3$. As specific examples, phenylalkoxysilane, alkylalkoxysilane, phenylalkylalkoxysilane, cycloalkylalkoxysilane, and cycloalkylalkylalkoxysilane can be given.

As more specific examples of the above organosilicon compound (D), di-n-propyldimethoxysilane, diisopropyldimethoxysilane, di-n-butyldimethoxysilane, diisobutyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, and 3,5-dimethylcyclohexylcyclopentyldimethoxysilane can be given. These organosilicon compounds (D) can be used individually or in a combination of two or more.

When the component (D) is used, the combinations of the component (D) with the component (C) include a combination of diethylaminotriethoxysilane and di-iso-propyldimethoxysilane, a combination of diethylaminotriethoxysilane and di-iso-butyldimethoxysilane, a combination of diethylaminotriethoxysilane and cyclohexylmethyldimethoxysilane, a combination of diethylaminotriethoxysilane and dicyclopentyldimethoxysilane, and a combination of diethylaminotriethoxysilane and cyclohexylcyclopentyldimethoxysilane.

Olefins can be polymerized or copolymerized using the catalyst for olefin polymerization of the present invention. The olefins such as ethylene, propylene, 1-butene, 1-pentene, 4-methyl-1-pentene, and vinyl cyclohexane can be used either individually or in combination of two or more. Of these, ethylene, propylene, and 1-butene can be suitably used. A particularly preferable olefin is propylene. Propylene may be copolymerized with other olefins. As the olefins to be copolymerized, ethylene, 1-butene, 1-pentene, 4-methyl-1-pentene, vinyl cyclohexane, and the like can be used either individually or in combination of two or more. Of these, ethylene and 1-butene can be suitably used. As the method for copolymerizing propylene with other olefins, random copolymerization of polymerizing propylene with a small amount of ethylene in one step and propylene-ethylene block copolymerization of polymerizing only propylene in a first step (first polymerization vessel) and copolymerizing propylene and ethylene in a second step (second polymerization vessel) are typical methods. The catalyst of the present invention comprising the components (A1) or (A2), component (B), and component (C) is effective in both the random copolymerization and block copolymerization for improving the catalytic activity, stereoregularity, catalyst activity to hydrogen, copolymerization performance, and properties of resulting copolymers. In addition to the catalyst component (C), the above-described component (D) maybe used. The components (C) and (D) may be used either as a mixture or separately in the two polymerization steps of the block copolymerization.

The ratio of each component used is not specifically limited inasmuch as such a ratio does not influence the effect of the present invention. Usually, the component (B) is used in the amount of 1 to 2000 mol, and preferably 50 to 1000 mol, per one mol of titanium atom in the component (A1) or the component (A2). The component (C) is used in the amount of 0.002 to 10 mol, preferably 0.01 to 2 mol, and particularly preferably 0.01 to 0.5 mol, per one mol of the component (B). If the component (D) is used in combination, the amount is 0.002 to 10 mol, preferably 0.01 to 2 mol, and particularly preferably 0.01 to 0.5 mol, per one mol of the component (B) and 0.01 to 100 mol, preferably 0.1 to 10 mol, and particularly preferably 0.1 to 1 mol, per one mol of the component (C).

Although the order of contact of these components is optional, it is desirable to first add the organoaluminum compound (B) to the polymerization system, then cause the amino silane compound (C) or a mixture of the components (C) and (D) to contact the organoaluminum compound (B), or cause the component (C) and component (D) in an optional order to contact the organoaluminum compound (B), and cause the solid catalyst component (A1) or (A2) to contact the resulting mixture. A method of forming a catalyst by adding the organoaluminum compound (B) to the polymerization system, separately causing the component (A1) or (A2) to contact the component (C) or the components (C) and (D), and feeding the contacted component (A1) or (A2) and component (C) or the components (C) and (D) to the polymerization system is also a preferable embodiment. It is possible to further improve the catalyst activity against hydrogen and crystalline properties of the resulting polymer by using a previously contacted mixture of the component (A1) or (A2) and component (C) or the components (C) and (D).

The polymerization of the present invention can be carried out either in the presence or in the absence of an organic solvent. Olefin monomers such as propylene may be used either in a gaseous state or in a liquid state. The polymerization reaction is preferably carried out at a temperature of 200° C. or less, and preferably at 100° C. or less, under a pressure of 10 MPa or less, and preferably 5 MPa or less. Either a continuous polymerization system or a batch polymerization system may be used for the polymerization reaction. In addition, the polymerization can be completed either in one step or in two or more steps.

In polymerizing olefins using the catalyst containing the component (A1) or (A2), component (B), and component (C) (hereinafter may be referred to as "main polymerization"), it is desirable to conduct pre-polymerization of the olefins prior to the main polymerization to further improve the catalyst activity, stereoregularity, properties of resulting polymer particles, and the like. In addition to the olefins used in the main polymerization, monomers such as styrene can be used in the pre-polymerization. Specifically, after causing the component (A1) or (A2) to contact the component (B) and/or the component (C) in the presence of olefins to pre-polymerize 0.1 to 100 g of the polyolefins for 1 g of the component (A1) or (A2), the component (B) and/or the component (C) are further caused to contact to form the catalyst. In the case where the component (D) is used in combination, it is possible to cause the component (A1) or (A2) to contact the components (B) and (D) in the presence of olefins during the pre-polymerization and to use the component (C) during the main polymerization.

Although the order of contact of the components and monomers in carrying out the pre-polymerization is optional, it is desirable to first add the component (B) to the pre-polymerization system in an inert gas or olefin gas atmosphere such as propylene, cause the component (A1) or (A2) to contact the component (B), and then cause one or more olefins such as propylene to contact the mixture.

The polymerization of olefins in the presence of the olefin polymerization catalyst prepared by the process of the present invention can produce olefin polymers with a melt flow rate (MI) several times higher than that of the polymers produced using a conventional catalyst by using the same amount of hydrogen. In addition, the olefin polymerization catalyst of the present invention exhibits the same or better performance as conventional catalysts in catalyst activity and the capability of producing polymers with high stereoregularity. Specifically, the catalyst of the present invention has been confirmed to remarkably improve the catalyst activity to hydrogen in the polymerization of olefins, while maintaining high catalyst activity and stereoregularity of the resulting polymers.

EXAMPLES

The present invention will be described in more detail by examples, which should not be construed as limiting the present invention.

Example 1

(Preparation of Solid Catalyst Component)

A 2,000 ml round bottom flask equipped with a stirrer, of which the internal atmosphere had been sufficiently replaced by nitrogen gas, was charged with 150 g of diethoxymagnesium and 750 ml toluene to prepare a suspension. The suspension was added to a solution of 450 ml of toluene and 300 ml of titanium tetrachloride in another 2,000 ml round bottom flask equipped with a stirrer, of which the internal atmosphere had been sufficiently replaced by nitrogen gas. The suspension was reacted at 5° C. for one hour. After the addition of 22.5 ml of di-n-butyl phthalate, the mixture was heated to 100° C. Then, 30 ml of cyclic polysiloxane (decamethylcyclopentasiloxane "TFS-405" manufactured by GE Toshiba Silicones Co., Ltd.) was added. The mixture was heated to 100° C. and reacted for two hours with stirring. After the reaction, the resulting reaction mixture was washed four times with 1,300 ml of toluene at 80° C. After the addition of 1,200 ml of toluene and 300 ml of titanium tetrachloride, the reaction mixture was heated to 110° C. and reacted for two hours with stirring. The intermediate washing and second process were repeated once more. The resulting reaction mixture was washed seven times with 1,300 ml of heptane at 40° C., filtered, and dried to obtain a solid catalyst component (A1) in the form of a powder. The content of titanium in the solid catalyst component was analyzed and found to be 3.1 wt %.

(Preparation of Polymerization Catalyst and Polymerization)

A 2.0 l autoclave equipped with a stirrer, of which the internal atmosphere had been entirely replaced by nitrogen gas, was charged with 1.32 mmol of triethylaluminum, 0.13 mmol of diethylaminotriethoxysilane, and the above solid catalyst component in an amount, in terms of the titanium atom contained therein, of 0.0026 mmol, thereby forming a polymerization catalyst. Then, with the addition of 1.5 l of hydrogen gas and 1.4 l of liquefied propylene, pre-polymerization was carried out for 5 minutes at 20° C., following which the pre-polymerization product was heated and main polymerization was carried out for one hour at 70° C. The polymerization activity, the heptane insoluble matters (HI), the melt index (MI), and the xylene soluble matters (XS) of the resulting polymer are shown in Table 1. The results of polymerization are also shown in Table 1.

The polymerization activity per 1 g of the solid catalyst component was calculated according to the following equation.

Polymerization activity=produced polymer $(F)$ $(g)$/ solid catalyst component $(g)$ The polymer (G) insoluble in n-heptane determined by extracting this polymer for 6 hours in boiling n-heptane was measured to determine the proportion of components insoluble in boiling n-heptane (HI) in this polymer according to the following equation.

$HI=(G)(g)/(F)(g)$

Xylene soluble components (XS) in the polymer was determined as follows.

Method for measuring xylene soluble components: 4.0 g of the polymer was added to 200 ml of p-xylene and dissolved while maintaining the mixture at the boiling point (138° C.) over two hours. The mixture was cooled to 23° C. and the soluble matters were separated from insoluble matters by filtration. The soluble components were dried with heating, and the polymer thus obtained was determined as xylene soluble components (wt %). The melt index (MI) of the polymer was determined according to the test method conforming to ASTM D1238 or JIS K7210.

Example 2

(Preparation of Solid Catalyst Component)

A 2,000 ml round bottom flask equipped with a stirrer, of which the internal atmosphere had been sufficiently replaced by nitrogen gas, was charged with 150 g of diethoxymagnesium and 750 ml toluene to prepare a suspension. The suspension was added to a solution of 450 ml of toluene and 300 ml of titanium tetrachloride in another 2,000 ml round bottom flask equipped with a stirrer, of which the internal atmosphere had been sufficiently replaced by nitrogen gas. The suspension was reacted at 5° C. for one hour. After the addition of 22.5 ml of dineopentyl 4-bromophthalate, the mixture was heated to 100° C. and reacted for two hours with stirring. After the reaction, the resulting reaction mixture was washed four times with 1,300 ml of toluene at 80° C. After the addition of 1,200 ml of toluene and 300 ml of titanium tetrachloride, the reaction mixture was heated to 110° C. and reacted for two hours with stirring. The intermediate washing and second process were repeated once more. The resulting reaction mixture was washed seven times with 1,300 ml of heptane at 40° C., filtered, and dried to obtain a solid catalyst component (A2) in the form of a powder. The content of titanium in the solid catalyst component was analyzed and found to be 2.9 wt %.

(Preparation of Polymerization Catalyst and Polymerization)

Polymerization was carried out in the same manner as in Example 1, except for using the solid catalyst composition prepared above. The results are shown in Table 1.

Example 3

A polymerization catalyst was prepared and polymerization was carried out in the same manner as in Example 2, except that di-n-butyl 4-bromophthalate was used instead of dineopentyl 4-bromophthalate for preparing the solid catalyst component. The results are shown in Table 1. The content of titanium in the solid catalyst component was analyzed and found to be 2.8 wt %.

Comparative Example 1

Apolymerization catalyst was prepared and polymerization was carried out in the same manner as in Example 1, except that cyclohexylmethyldimethoxysilane was used instead of diethylaminotriethoxysilane for preparing the solid catalyst component. The results are shown in Table 1.

Comparative Example 2

A polymerization catalyst was prepared and polymerization was carried out in the same manner as in Example 2, except that cyclohexylmethyldimethoxysilane was used instead of diethylaminotriethoxysilane for preparing the solid catalyst component. The results are shown in Table 2.

Comparative Example 3

A polymerization catalyst was prepared and polymerization was carried out in the same manner as in Example 3, except that cyclohexylmethyldimethoxysilane was used instead of diethylaminotriethoxysilane for preparing the solid catalyst component. The results are shown in Table 1.

TABLE 1

| | Polymerization activity (g-PP/g-cat.) | HI (wt %) | MI (g/10 min) | XS (wt %) |
|---|---|---|---|---|
| Example 1 | 49,100 | 99.1 | 6.3 | 1.1 |
| Example 2 | 48,700 | 99.1 | 19 | 1.7 |
| Example 3 | 46,500 | 98.8 | 17 | 1.5 |
| Comparative Example 1 | 51,000 | 99.2 | 3.5 | 0.9 |
| Comparative Example 2 | 47,400 | 99.1 | 6.1 | 1.1 |
| Comparative Example 3 | 45,100 | 98.7 | 5.2 | 1.3 |

Example 4

The experiment was carried out in the same manner as in Example 1, except that the amount of hydrogen gas used for preparing the polymerization catalyst and carrying out the polymerization reaction was increased to 4.0 l from 1.5 l. The results are shown in Table 2.

Example 5

The experiment was carried out in the same manner as in Example 2, except that the amount of hydrogen gas used for preparing the polymerization catalyst and carrying out the polymerization reaction was increased to 4.0 l from 1.5 l. The results are shown in Table 2.

Example 6

The experiment was carried out in the same manner as in Example 3, except that the amount of hydrogen gas used for preparing the polymerization catalyst and carrying out the polymerization reaction was increased to 4.0 l from 1.5 l. The results are shown in Table 2.

Comparative Example 4

The experiment was carried out in the same manner as in Comparative Example 1, except that the amount of hydrogen gas used for preparing the polymerization catalyst and carrying out the polymerization reaction was increased to 4.0 l from 1.5 l. The results are shown in Table 2.

Comparative Example 5

The experiment was carried out in the same manner as in Comparative Example 2, except that the amount of hydrogen gas used for preparing the polymerization catalyst and carrying out the polymerization reaction was increased to 4.0 l from 1.5 l. The results are shown in Table 2.

Comparative Example 6

The experiment was carried out in the same manner as in Comparative Example 3, except that the amount of hydrogen gas used for preparing the polymerization catalyst and carrying out the polymerization reaction was increased to 4.0 l from 1.5 l. The results are shown in Table 2.

TABLE 2

| | Polymerization activity (g-PP/g-cat.) | HI (wt %) | MI (g/10 min) | XS (wt %) |
|---|---|---|---|---|
| Example 4 | 48,200 | 98.2 | 58 | 1.0 |
| Example 5 | 56,700 | 98.2 | 130 | 1.6 |
| Example 6 | 51,200 | 98.3 | 115 | 1.5 |
| Comparative Example 4 | 46,800 | 98.8 | 16 | 1.0 |
| Comparative Example 5 | 56,400 | 98.2 | 31 | 1.5 |
| Comparative Example 6 | 51,500 | 98.5 | 28 | 1.7 |

The above results show that if the catalyst of the present invention is used during the polymerization, the MI value is higher, specifically the activity to hydrogen is higher, than in Comparative Examples using a conventional catalyst and the same amount of hydrogen. In addition, it can be seen that the stereoregularity of the polymer obtained in the region of an MI value of 50 or more or 100 or more is equivalent or higher.

The catalyst for polymerization of olefins of the present invention exhibits catalytic activity to hydrogen remarkably higher than the conventional catalyst and can maintain high stereoregularity of polymers and high yield performance. Therefore, due to the reduction of hydrogen consumption for polymerization, the catalyst is expected not only to produce polyolefins for common use at a low cost, but also to be useful in the manufacture of polyolefins having high functions.

What is claimed is:

1. An olefin polymerization catalyst comprising the following components (A1), (B), and (C):
   (A1) a solid catalyst component prepared by contacting (a1) a dialkoxymagnesium, (b1) a tetravalent titanium halide, (c1) an electron donor compound, and (d1) a polysiloxane,
   (B) an organoaluminum compound of the following formula (1), $$R^1_p AlQ_{3-p} \tag{1}$$

wherein $R^1$ represents an alkyl group having 1–4 carbon atoms, Q represents a hydrogen atom or a halogen atom, and p represents a real number satisfying the formula $0 < p \leq 3$, and
   (C) an aminosilane compound of the following formula (2), $$(R^2 R^3 N)Si(OR^4)_3 \tag{2}$$

wherein $R^2$ represents a linear or branched alkyl group having 1–12 carbon atoms or a hydrogen atom, $R^3$ represents a linear or branched alkyl group having 1–12 carbon atoms which may be either the same as or different from $R^2$, and $R^4$ represents a linear or branched alkyl group having 1–4 carbon atoms.

2. The catalyst for olefin polymerization according to claim 1, wherein the solid catalyst component (A1) is prepared by contacting (a1) a dialkoxymagnesium, (b1) a tetravalent titanium halide, (c1) an electron donor compound, (d1) a polysiloxane, and (e1) an aromatic hydrocarbon.

3. The catalyst for olefin polymerization according to claim 1, wherein the dialkoxymagnesium (a1) is diethoxymagnesium.

4. The catalyst for olefin polymerization according to claim 1, wherein the electron donor compound (c1) is a phthalic acid diester.

5. The catalyst for olefin polymerization according to claim 1, wherein the electron donor compound (c1) is a phthalic acid diester derivative.

6. The catalyst for olefin polymerization according to claim 5, wherein the phthalic acid diester derivative is a 4-bromophthalic acid diester.

7. An olefin polymerization catalyst comprising the following components (A2), (B), and (C):
  (A2) a solid catalyst component prepared by contacting (a1) a dialkoxymagnesium, (b1) a tetravalent titanium halide, and (c2) a phthalic acid diester derivative,
  (B) an organoaluminum compound of the following formula (1), $$R^1_p AlQ_{3-p} \qquad (1)$$

wherein $R^1$ represents an alkyl group having 1–4 carbon atoms, Q represents a hydrogen atom or a halogen atom, and p represents a real number satisfying the formula $0<p\leqq 3$, and (C) an aminosilane compound of the following formula (2), $$(R^2R^3N)Si(OR^4)_3 \qquad (2)$$

wherein $R^2$ represents a linear or branched alkyl group having 1–12 carbon atoms or a hydrogen atom, $R^3$ represents a linear or branched alkyl group having 1–12 carbon atoms which may be either the same as or different from $R^2$, and $R^4$ represents a linear or branched alkyl group having 1–4 carbon atoms.

8. The catalyst for olefin polymerization according to claim 7, wherein the solid catalyst component (A2) is prepared by contacting (a1) a dialkoxymagnesium, (b1) a tetravalent titanium halide, (c2) a phthalic acid diester derivative, and (e1) an aromatic hydrocarbon.

9. The catalyst for olefin polymerization according to claim 7, wherein the dialkoxymagnesium (a1) is diethoxymagnesium.

10. The catalyst for olefin polymerization according to claim 7, wherein the phthalic acid diester derivative is a 4-bromophthalic acid diester.

* * * * *